United States Patent [19]

Ehringer

[11] 3,777,111
[45] Dec. 4, 1973

[54] METHOD OF MAKING GREATLY ELONGATED TUNGSTEN OR MOLYBDENUM MEMBERS

[75] Inventor: Hermann J. Ehringer, West Orange, N.J.

[73] Assignee: Westinghouse Electric Corporation, Pittsburgh, Pa.

[22] Filed: May 10, 1972

[21] Appl. No.: 251,956

[52] U.S. Cl..................... 219/105, 29/481, 219/58, 219/118
[51] Int. Cl............................................. B23k 11/02
[58] Field of Search..................... 219/105, 104, 56, 219/57, 58, 118; 29/481

[56] References Cited
UNITED STATES PATENTS

| 3,259,969 | 7/1966 | Tessman | 219/104 X |
| 3,384,731 | 5/1968 | Draving | 219/57 |
| 1,857,505 | 5/1932 | Heinman | 219/105 X |
| 3,613,107 | 10/1971 | Cavagnero | 219/104 X |
| 1,467,792 | 9/1923 | Holmes | 219/105 |
| 3,621,176 | 11/1971 | Valente | 219/57 |

Primary Examiner—R. F. Staubly
Assistant Examiner—L. A. Schutzman
Attorney—A. T. Stratton et al.

[57] ABSTRACT

For making greatly elongated tungsten or molybdenum members, sintered or cast tungsten or molybdenum ingots are initially mechanically worked to the form of somewhat elongated rods, which are then joined to one another. The ends of the elongated rods which are to be joined are first tapered to a frustum configuration, and the tapered ends are abutted and electrically resistance heated to a plastic condition while simultaneously being forced together. This results in creating an upset of the plastic rod material, which upset is so controlled that all of the rod material which has been heated to a plastic condition and also exposed to reactive conditions is contained in the formed upset. The upset is then removed by grinding in order to remove from the now-joined rods any impurities which may have been entrapped during the welding operation, and the resulting greatly elongated rod is then further mechanically reduced in diameter to a final predetermined size.

9 Claims, 6 Drawing Figures

FIG. I.

METHOD OF MAKING GREATLY ELONGATED TUNGSTEN OR MOLYBDENUM MEMBERS

BACKGROUND OF THE INVENTION

This invention relates to the making of very long tungsten or molybdenum members and, more particularly, to a method for making such members by a carefully controlled butt welding technique, whereby any impurity materials which are entrapped during the welding operation are mechanically removed from the joined tungsten or molybdenum members.

In the manufacture of tungsten filaments for incandescent lamps, the tungsten is initially formed into a relatively massive sintered ingot usually by electrical self-resistance sintering in a hydrogen atmosphere. Thereafter, the ingot is swagged through a large number of swaging passes to a greatly elongated form, with the final swaging pass providing a diameter for the elongated rod of about 110 mils (2.79 mm). Operations thereafter are continued through a large number of drawing passes and a final representative diameter for the tungsten filament is about 2.5 mils (63.5 $\mu$m). Of course this will vary for different lamp types. One of the major labor cost factors in processing the tungsten filament is the necessity for threading the tungsten through the drawing dies between individual passes. As is apparent, if the tungsten could initially be prepared in a much longer form, the labor factor involved in threading the tungsten through the drawing dies would be correspondingly reduced.

in the processing of molybdenum, a molybdenum sintered or cast ingot is normally rolled or swaged and drawn to a final desired diameter. Again, a labor factor is involved in handling the molbybdenum and it would be desired to have a much longer molybdenum member with which to work. In addition, for such applications as involve molybdenum metallizing, it is desirable to have greatly elongated rolls of molybdenum in order to minimize the labor costs involved. In the practices of the prior art, it has been impractical to weld or otherwise affix tungsten or molybdenum members to one another without entrapping impurities and/or forming points at which fracture will readily occur.

Welding of metal members with a butt-welding technique wherein the ends of the members to be welded are somewhat tapered has been known for many years, and is described in FIGS. 5–7 of U.S. Pat. No. 438,657, dated Oct. 21, 1890. A similar technique is disclosed in FIG. 8 of U.S. Pat. No. 434,530, dated Aug. 19, 1890. In U.S. Pat. No. 2,021,157, dated Nov. 19, 1935 is disclosed a method for welding members to form a chain wherein the conical or wedge shaped ends of the chain link to be formed are abutted and then forced together to cause a swell or upset, with the swell apparently later forged to a desired configuration. In U.S. Pat. No. 3,134,009 the ends of chain members to be formed by welding are provided with a conical configuration and in U.S. Pat. No. 3,384,731, dated May 21, 1968, it is disclosed that tungsten members can be welded to one another, with one of the tungsten members being welded having a pointed end, see the end member 317a in FIG. 24 of this patent. All of the foregoing techniques will result in entrapping impurities if the material being welded is tungsten or molybdenum, or will form stress points for failure at the weld, or both.

SUMMARY OF THE INVENTION

The present invention comprises a method of joining end portions of elongated tungsten or molybdenum rods, each of which has been mechanically reduced in cross-sectional area from a relatively massive sintered or cast ingot of predetermined size to a predetermined reduced cross-sectional area which is still substantially larger than that final predetermined cross-sectional area which is desired. After joining, the resulting elongated rod is further mechanically reduced in cross-sectional area to a final predetermined value, to provide a single homogeneous member of greatly increased length. In making the jointure, those end sections of each rod to which jointure is to be made are tapered to a generally frustum configuration wherein the cross-sectional area of the rod compared to the area of the minor frustum base has a ratio from about 2:1 to 25:1. The tapered exposed rod ends are aligned and abutted and there is applied to the abutted rods an axial force to maintain the abutted rod ends under axial compression. Simultaneously, there is axially passed through the tapered rod sections an electric current of sufficient magnitude to heat the abutted rod end faces to a plastic condition and cause the abutted faces to be upset laterally toward the outermost peripheral portions of the rods. The heating and pressure are continued to cause more of the now-plastic rod material to upset laterally toward the outermost peripheral rod portions and the axial force is maintained until all of the previously tapered rod sections have been enlarged as upsets to a cross-sectional area greater than that of the undistorted rod portions. In this manner, substantially all portions of the rods which were heated to a plastic condition and simultaneously exposed to reactive conditions are contained in portions of the formed upsets which are further displaced from the axis of the rods than is the periphery of the undistorted rod portions. After cooling, the upsets are mechanically removed such as by grinding so that all portions of the now-joined rods have an outer periphery which is uniform. In this manner, all impurities which may have been imparted to the joined rods during the welding of same are mechanically removed. Thereafter, the elongated joined rods are further mechanically reduced to their final predetermined desired cross-sectional area.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

For processing tungsten, a typical sintered tungsten ingot will have dimensions of ½×⅝inch ×21 inches (1.27 cm × 1.59 cm × 53.3 cm) and this ingot is swaged in accordance with conventional techniques to a rod having a diameter of 0.4 inch (1.02 cm) and an area of about 0.12 sq. in. (0.8 sq. cm). It has been found necessary to work the ingot to some degree to provide it with sufficient mechanical strength to enable it to be joined by welding, and this mechanical strength is obtained through the foregoing swaging operations which provide the ingot with a "worked" structure.

Figure 1:
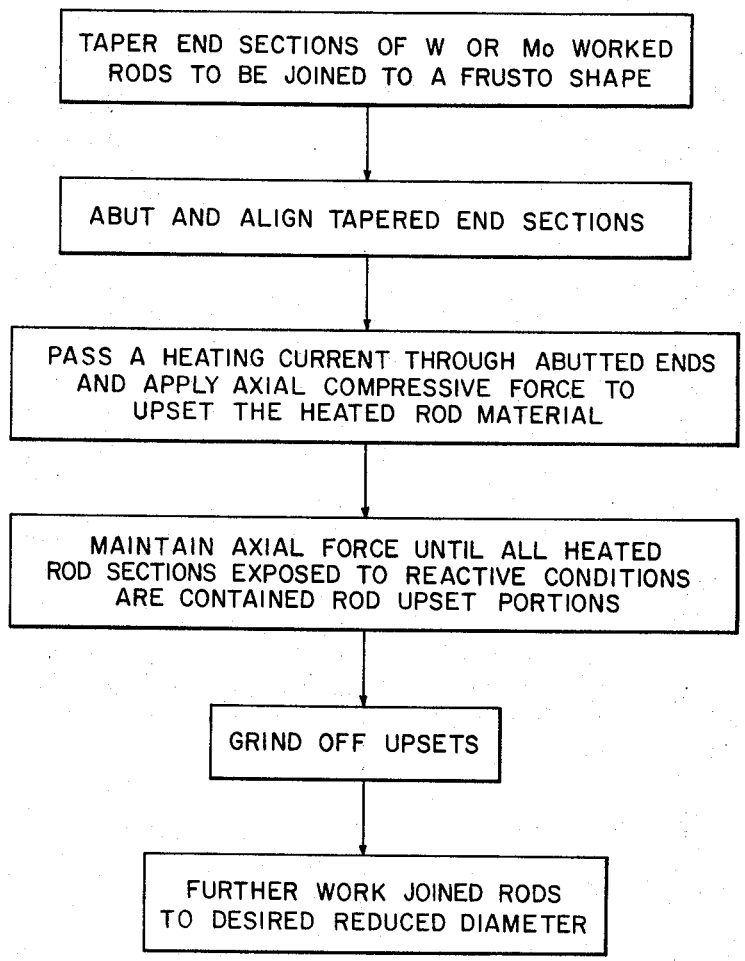
FIG. 1 is a flow diagram illustrating the basic steps of the present method.

In accordance with the present method, and as set forth in the flow chart in FIG. 1, the end sections of formed tungsten rods which are to be joined are tapered to a frustum configuration. The cross-section of the rod represents the frustum major base portion and this cross-sectional area can be represented by $A_B$. The exposed end or face of the formed frustum configuration constitutes a frustum minor base portion and has an area represented by $A_b$. It has been found that the ratio of $A_B$ to $A_b$ should be from about 2:1 to 25:1, and preferably, this ratio is from about 4:1 to 9:1. To insure consistent results, the angle of the taper as measured with respect to the axis of the rods desirably is from about 10° to about 45°, with the preferred angle of taper being from about 15° to about 30°.

In the next step of the operation, the small exposed rod ends are aligned and abutted and there is applied to the rods an axial force in order to maintain the abutted rod ends under axial compression. For the specific tungsten rods which have a diameter of 0.4 inch (1.02 cm), an electric current having a magnitude of 12,000 amperes is utilized and the compressive force is 10,000 pounds.

Figure 2:
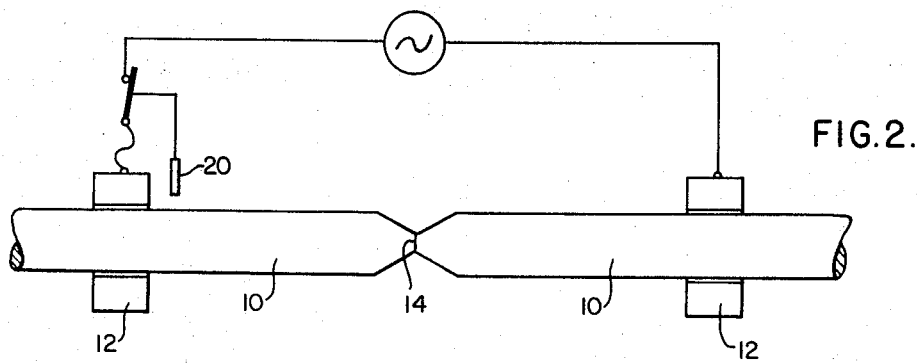
FIG. 2 is a schematic diagram of an apparatus which can be used in order to effect the butt welding.
Figure 3:
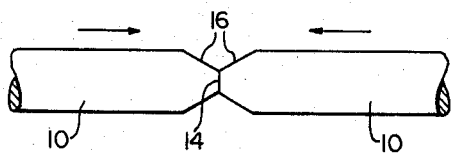
FIG. 3 is a view showing the tapered rods to be welded with their end faces abutting.

An apparatus which is suitable for effecting the welding is shown in diagrammatic form in FIG. 2, wherein the gungsten rods 10 to be welded are positioned in gripping and retaining members 12 which serve the dual function of holding the rods 10 and also making electric contact thereto, with the tapered end faces 14 of the rods aligned and abutted. A small section of the abutted rods is shown in FIG. 3 wherein each rod 10 has the ends to be joined provided with a tapered 16 which terminates in ends or faces 14 which constitute the frustum minor base portions.

Figure 4:
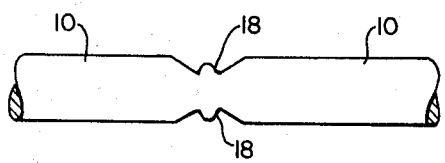
FIG. 4 shows the initial formation of the upset obtained during the welding operation.
Figure 5:
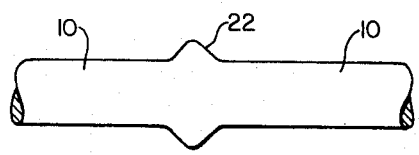
FIG. 5 shows the completed weld with the upset portion formed between the joined rods.

Upon application of the heavy current through the abutted rods, the abutted faces 14 will be rapidly heated to a plastic condition and under the application of the applied force, an upset 18 will start to form, as shown in FIG. 4, which results from the abutted rod faces 14 being upset laterally toward the outermost peripheral portions of the rods. The heating and compressive force is continued to cause more and more of the now-plastic rod material to upset. In the preferred form of the invention, the apparatus as shown in FIG. 2 is provided with a limit switch 20 which is contacted by the moving retaining member 12 to open the heating circuit and simultaneously increase the compressive force from 10,000 lbs. to 30,000 lbs. This provides a very rapid upset of the remaining plastic rod material to form a "free upset" whereby the rod decrease in plasticity inhibits any further formation of upsets. As a specific example, for the specific tungsten rods considered hereinbefore, the heating current is continued for a period of about 2 to 3 seconds, and once the heating current is removed, the rods cool very rapidly. Referring to FIGS. 3 through 5, if the end faces 14 of the rods to be joined are too small, the initial heating will be too localized and not enough material will be pushed into the formed upsets, so that residual impurities will be entrapped at the jointure between the rods. Similarly, if the faces 14 are overly large, the heating will not be sufficiently localized to push all of the potentially contaminated material into the upsets. For this reason, the ratio of the areas of the frusto major base ($A_B$) to the frusto minor base ($A_b$) for each ground rod should vary from 2:1 to 25:1, and this ratio is preferably maintained at from 4:1 to 9:1. Regarding the angle of taper for the formed frusto configurations, if the angle is too small, there will not be sufficient localized heating to push all of the potentially contaminated material into the upset and, conversely, if the angle is too large, the heating will be too localized to enable the possibly contaminated material to be pushed into the upset for later removal.

Considering the jointure of the tungsten members as described hereinbefore, the initial heating effected by the current of 12,000 amperes maintained from two to three seconds first heats the end faces 14 and the heating rapidly progresses axially along the rods so that all of the ground rod portions and a small portion of the rods which are not ground are heated to a plastic condition. As a result, the final formed upsets 22, as shown in FIG. 5, contain some of the rod portions which have not been tapered. As a result, substantially all portions of the rods which were heated to a plastic condition during the welding of same, and simultaneously exposed to reactive conditions, are contained in portions of the formed upsets 22 which are further displaced from the axis of the joined rods than is the periphery of the undistorted rod portions.

The joined rods are then cooled and the formed upsets 22 are mechanically removed, such as by grinding, so that all portions of the joined rods have an outer periphery which is uniform. A joined rod 10 with the upset 22 ground away at 24 shown in FIG. 6. Preferably, the rod jointure is then annealed to relieve any stresses and for the specific tungsten rods considered hereinbefore, annealing is accomplished by heating at a temperature of approximately 2000° C for three minutes in a hydrogen atmosphere. Thereafter, the joined and greatly elongated rod is worked to a final desired diameter, such as by swaging to a diameter of 110 mils (2.79 mm) and thereafter drawing to a final filament diameter such as 2.5 mils (63.5μm).

The working of the elongated tungsten rod after the jointure imparts thereto a worked structure so that the final material is ductile and can be readily formed into lamp filament coils. In addition, all impurities which were introduced into the weld are removed by grinding away the upsets 22 so that the final result is a single homogeneous member or rod 10 of greatly increased length. It should be clear that two or more rods can be readily joined by this method, thereby to minimize the manual operations involved in the extended drawing operations which are required to produce the filamentary wire.

While it is preferred to use a frustum-type configuration, which can either be a frustum of a cone or a frustum of a pyramid, for example, it should be clear that some deviation from a classic straight-sided frustum configuration is possible with the present method. Accordingly, it is proper to define the ground ends of the rod as having a generally frustum configuration since some curvature of the ground portions, as viewed in an axial dimension will produce a satisfactory jointure.

Figure 6:
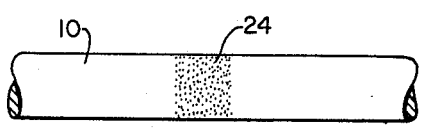
FIG. 6 shows the joined rods with the upset portion ground away.

While the foregoing discussion has considered in detail the jointure of tungsten rods, the present method is equally applicable for joining molybdenum rods. As a specific example, a molybdenum ingot, which can be formed by casting or sintering, can have a cross-sectional dimension of 1.75 square inches (11.25 sq. cm) and a length of 20 inches (50.8 cm). The molybdenum ingots are rolled or swaged to a diameter of 0.3 inch (0.76 cm) and an area of 0.07 sq. in. (0.45 sq. cm), tapered as in the case of tungsten, and then joined. For these specific molybdenum rods, it has been found that an electric heating current of about 10,000 amperes passed through the abutted rod ends and maintained for about ½ second is sufficient to effect the heating of same while simultaneously applying an axial force of about 10,000 lbs. to maintain the abutted rod ends under compression and cause the formation of the rod upsets to be initiated. Thereafter, as initiated by the limit switch 20, the electric heating current is stopped and the axial force is simultaneously increased to about 30,000 lbs. and maintained until no further rod upset occurs. Thereafter, the formed upsets 22 are ground off, as shown in FIG. 6, the molybdenum preferably annealed such as by heating to a temperature of 1200°C for for two minutes in an air atmosphere, and the joined elongated rod is then mechanically reduced to a final desired size. In the case of molybdenum, the rod may be swaged and then drawn, but it is preferred to roll same to a final desired diameter, and molybdenum as used for spray-bonding normally has a diameter which can vary from 0.2 inch (0.508 cm) TO 90 mils (2.28 mm).

I claim:

1. The method of joining end portions of elongated tungsten or molybdenum rods each of which has been mechanically reduced in cross-sectional area from a relatively massive sintered or cast ingot of predetermined size to a predetermined reduced cross-sectional area which is substantially larger than that final predetermined cross-sectional area which is desired, and thereafter further mechanically reducing the cross-sectional area of the joined rods to a predetermined value to provide a single homogeneous member of greatly increased length, which method comprises:

a. tapering those ends sections of each said rod to which jointure is to be made to a generally frustum configuration which tapers from a frustum major base portion having an area equal to the cross-sectional area of said rods ($A_B$) to a smaller exposed end constituting a frustum minor base portion having an area ($A_b$), with the ratio of $A_B:A_b$ being from about 2:1 to 25:1;

b. aligning and abutting said smaller exposed rod ends and applying to said rods an axial force to maintain said abutted rod ends under axial compression, and axially passing through said tapered rod sections an electric current of sufficient magnitude to heat said abutted rod end faces to a plastic condition and cause the abutted rod faces to be upsed laterally toward the outermost peripheral portions of said rods;

c. continuing to maintain said abutted rods under said axial force and continuing to pass current therethrough to progressively heat more of said tapered rod sections to a plastic condition and cause more of the now-plastic rod material to upset laterally toward the outermost peripheral portions of said rods;

d. maintaining said axial force on said rods until all of said previously tapered rod sections have been enlarged as upsets to a cross-sectional area greater than that of the undistorted rod portions and substantially all portions of said rods which were heated to a plastic condition and simultaneously exposed to reactive conditions are contained in portions of the formed upsets which are further displaced from the axis of said rods than is the periphery of undistorted rod portions;

e. cooling the now-joined rods;

f. mechanically removing said upsets so that all portions of said joined rods have an outer periphery which is uniform; and g. further mechanically reducing said joined rods to a predetermined desired cross-sectional area.

2. The method as specified in claim 1, wherein the angle of the taper of said tapered end sections as measured with respect to the axis of said rods is from about 10° to about 45°.

3. The method as specified in claim 2, wherein the angle of the taper of said tapered end sections is from about 15° to about 30°.

4. The method as specified in claim 1, wherein prior to further mechanical reduction of the cross-sectional area of said joined rods, at least the joined portion thereof is annealed to stress relieve same.

5. The method as specified in claim 1, wherein the heating current is stopped at a predetermined time prior to removal of the compressive force to limit the further formation of rod upsets by cooling of the heated rod portions.

6. The method as specified in claim 5, wherein after the abutted end portions of said rods have become plastic, the axial compressive force applied thereto is increased to increase the rate of formation of rod upset.

7. The method as specified in claim 6, wherein the said axial force is maintained until said rods have substantially cooled.

8. The method as specified in claim 7, wherein the cross-sectional area ($A_B$) of each said tunhsten rod to be joined is about 0.12 square inch and the frustum minor base portion of each said tungsten rod to be joined has such area that the ratio of $A_B:A_b$ is from about 4:1 to 9:1, and the angle of taper of each said tapered end section is from about 15° to 30°, an electric heating current of about 12,000 amperes is passed through said abutted rod ends and maintained for about 2 to 3 seconds while simultaneously an axial force of about 10,000 pounds is applied to maintain said abutted rod ends under compression and causes the formation of said rod upsets to be initiated, thereafter the heating current is stopped and the axial force is simultaneously increased to about 30,000 pounds and maintained until no further rod upset occurs.

9. The method as specified in claim 7, wherein the cross-sectional area ($A_B$) of each said molybdenum rod to be joined is about 0.07 square inch and the frustum minor base portion of each said molybdenum rod to be joined has such area that the ratio of $A_B:A_b$ is from about 4:1 to 9:1, and the angle of taper of each said tapered end section is from about 15° to 30°, an electric heating current of about 10,000 amperes is passed through said abutted rod ends and maintained for about one-half second while simultaneously an axial force of about 10,000 pounds is applied to maintain said abutted rod ends under compression and cause the formation of said rod upsets to be initiated, thereafter the heating current is stopped and the axial force is simultaneously increased to abut 30,000 pounds and maintained until no further rod upset occurs.

* * * * *